(12) United States Patent
Olliphant et al.

(10) Patent No.: US 8,433,653 B2
(45) Date of Patent: *Apr. 30, 2013

(54) CENTRALIZED TRANSACTION RECORD STORAGE

(75) Inventors: Hugo Olliphant, San Francisco, CA (US); Kristen Ondeck, San Jose, CA (US); German Scipioni, San Jose, CA (US); Jeremy Downs, San Francisco, CA (US)

(73) Assignee: EBAY Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,200

(22) Filed: Apr. 18, 2012

(65) Prior Publication Data

US 2012/0203692 A1  Aug. 9, 2012

Related U.S. Application Data

(60) Continuation of application No. 13/162,472, filed on Jun. 16, 2011, which is a division of application No. 11/855,408, filed on Sep. 14, 2007, now Pat. No. 8,024,267.

(51) Int. Cl.
*G06Q 10/00* (2012.01)
*G06F 17/30* (2006.01)

(52) U.S. Cl.
USPC ............................... 705/39; 705/1; 707/758

(58) Field of Classification Search .............. 705/1, 39; 707/758
See application file for complete search history.

(56) References Cited

U.S. PATENT DOCUMENTS

| 6,026,376 | A | 2/2000 | Kenney |
| 6,697,838 | B1* | 2/2004 | Jakobson ............... 709/203 |
| 8,024,267 | B2 | 9/2011 | Olliphant et al. |
| 2001/0016833 | A1* | 8/2001 | Everling et al. .......... 705/39 |
| 2002/0004770 | A1* | 1/2002 | Phillips et al. ........... 705/34 |

(Continued)

FOREIGN PATENT DOCUMENTS

WO   WO-00/75834 A2   12/2000
WO   WO 0075834 A2 * 12/2000

OTHER PUBLICATIONS

Using eBay Toolbar's Account Guard, http://pages.ebay.com/help/confidence/account-guard.html, Sep. 14, 2007, 2 pages.

(Continued)

*Primary Examiner* — William Rankins
(74) *Attorney, Agent, or Firm* — Haynes and Boone, LLP

(57) ABSTRACT

A system according to an embodiment comprises a plurality of searchable machine-readable transaction records associated with a plurality of user accounts, the searchable machine-readable transaction records comprising transaction information associated with a plurality of user-merchant transactions, wherein the transaction information is provided by merchant server(s) and is captured and passed by one or more users to the system in response to a determination performed at a respective client device of the user(s) that a webpage comprises transaction information such that an address of the webpage matches an address in a transaction webpage database; one or more processors; and one or more memories adapted to store a plurality of machine-readable instructions which when executed by the processor(s) are adapted to cause the system to provide: a transaction record processing application configured to store the captured transaction information in the searchable machine-readable transaction records associated with the user accounts on the system.

20 Claims, 8 Drawing Sheets

U.S. PATENT DOCUMENTS

| | | | |
|---|---|---|---|
| 2002/0026395 A1* | 2/2002 | Peterson | 705/35 |
| 2002/0091562 A1* | 7/2002 | Siegel et al. | 705/10 |
| 2002/0128851 A1* | 9/2002 | Chefalas et al. | 705/1 |
| 2002/0129062 A1* | 9/2002 | Luparello | 707/513 |
| 2002/0184302 A1 | 12/2002 | Prueitt et al. | |
| 2002/0191562 A1 | 12/2002 | Kumaki et al. | |
| 2003/0074253 A1* | 4/2003 | Scheuring et al. | 705/10 |
| 2003/0084001 A1* | 5/2003 | Chang | 705/64 |
| 2003/0126094 A1* | 7/2003 | Fisher et al. | 705/75 |
| 2004/0105126 A1 | 6/2004 | Minowa et al. | |
| 2004/0117315 A1* | 6/2004 | Cornuejols | 705/64 |
| 2004/0162778 A1* | 8/2004 | Kramer et al. | 705/40 |
| 2004/0210527 A1* | 10/2004 | Woda et al. | 705/40 |
| 2005/0021480 A1* | 1/2005 | Haff et al. | 705/75 |
| 2006/0082807 A1 | 4/2006 | Tanaka et al. | |
| 2007/0022007 A1* | 1/2007 | Lawe | 705/14 |
| 2007/0053518 A1* | 3/2007 | Tompkins et al. | 380/270 |
| 2007/0179950 A1* | 8/2007 | Kester et al. | 707/6 |
| 2007/0198360 A1 | 8/2007 | Rogers et al. | |
| 2007/0244761 A1 | 10/2007 | Scipioni | |
| 2007/0299772 A1* | 12/2007 | Mastie et al. | 705/39 |
| 2008/0028444 A1* | 1/2008 | Loesch et al. | 726/4 |
| 2008/0208761 A1 | 8/2008 | Autry et al. | |
| 2009/0171900 A1 | 7/2009 | Phillips et al. | |

OTHER PUBLICATIONS

Billeo: Password Manager, Form Fill, Bill Pay, Save Web Pages, http://www.billeo.com/sa_tour.jsp, Sep. 14, 2007, 5 pages.

* cited by examiner

CENTRALIZED TRANSACTION RECORD STORAGE

RELATED APPLICATIONS

This application is a continuation of U.S. patent application Ser. No. 13/162,472, filed on Jun. 16, 2011, which is a divisional application of U.S. Pat. No. 8,024,267 (Ser. No. 11/855,408, filed on Sep. 14, 2007), the contents of which are incorporated herein by reference in their entirety.

BACKGROUND

1. Field of the Invention

The present invention generally relates to online transactions and more particularly to the storage of records associated with online transactions.

2. Related Art

Customers routinely search for and purchase products and services through electronic communications with online merchants over electronic networks such as the Internet. In this regard, individual consumers may frequently engage in transactions with a variety of merchants through, for example, various merchant websites.

During the course of these transactions, merchants may provide customers with receipts or other records. It is generally the consumer's responsibility to locally store these merchant receipts for future reference. Unfortunately, different merchants may provide receipts in a variety of faints with little or no consistency in the way information is presented.

As a result, customers may be forced to implement appropriate receipt storage using a trial and error approach. Moreover, in order to maintain useful records, customers must continuously implement such an approach as additional transactions are performed.

Nevertheless, the demands on consumers associated with such approaches can become onerous as the number of user-merchant transactions and the number of visited merchant websites increase. Consequently, consumers may be unable to consistently maintain satisfactory records, especially for purposes of finding transaction details which may be relevant for future transactions or activities.

SUMMARY

In accordance with an embodiment of the disclosure, a payment service processing system comprises: a plurality of searchable machine-readable transaction records associated with a plurality of user accounts, the searchable machine-readable transaction records comprising transaction information associated with a plurality of user-merchant transactions, wherein the transaction information is provided by one or more merchant servers and is captured and passed by one or more users to the payment service processing system in response to a determination performed at a respective client device of the user(s) that a webpage comprises transaction information such that an address of the webpage matches an address in a transaction webpage database. The system also comprises one or more processors; and one or more memories adapted to store a plurality of machine-readable instructions which when executed by the one or more processors are adapted to cause the system to provide: a transaction record processing application configured to store the captured transaction information in the searchable machine-readable transaction records associated with the user accounts on the payment service processing system.

In accordance with another embodiment of the disclosure, a machine-implemented method of managing transaction information, wherein the method is performed by a payment service processing system associated with a payment service provider, comprises: receiving, at the payment service processing system, transaction information associated with a user-merchant transaction, wherein the transaction information is provided by a merchant server and is captured and passed by a user to the payment service processing system in response to a determination performed at the client device that a webpage comprises transaction information such that an address of the webpage matches an address in a transaction webpage database; and storing the captured transaction information in a searchable machine-readable transaction record associated with a user account on the payment service processing system.

In accordance with another embodiment of the disclosure, a machine-implemented method of processing transaction information, wherein the method is performed by a client device of a user, comprises: receiving, at the client device, transaction information associated with a user-merchant transaction, wherein the transaction information is provided by a merchant server; determining, at the client device, whether a webpage comprises the transaction information such that if an address of the webpage matches an address of a transaction webpage database, then the webpage comprises the transaction information; in response to determining that the webpage comprises at least a portion of the transaction information, capturing, at the client device, at least a portion of the transaction information associated with the user-merchant transaction, and passing, by the client device, the transaction information over a network in order to facilitate storage of the transaction information in a transaction record.

These and other features and advantages of the present disclosure will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

In accordance with various embodiments disclosed herein, user online transaction records comprising transaction information associated with various user-merchant transactions can be conveniently stored by a payment service provider and subsequently reviewed by a user. For example, in one embodiment, transaction information such as receipts for a plurality of different merchants may be aggregated by a payment service provider, thereby allowing a user to search the information. In another embodiment, the transaction information may include user-selectable links to permit users to purchase products or services (i.e., items) referenced by the transaction records.

In yet another embodiment, the transaction information may include, for example, various terms and conditions (e.g., warranty information, return policies, price guarantees, and/or other information) associated with items purchased by users. In another embodiment, users may request additional services (e.g., warranty services) through a user interface facilitated by the payment service provider.

Figure 1:
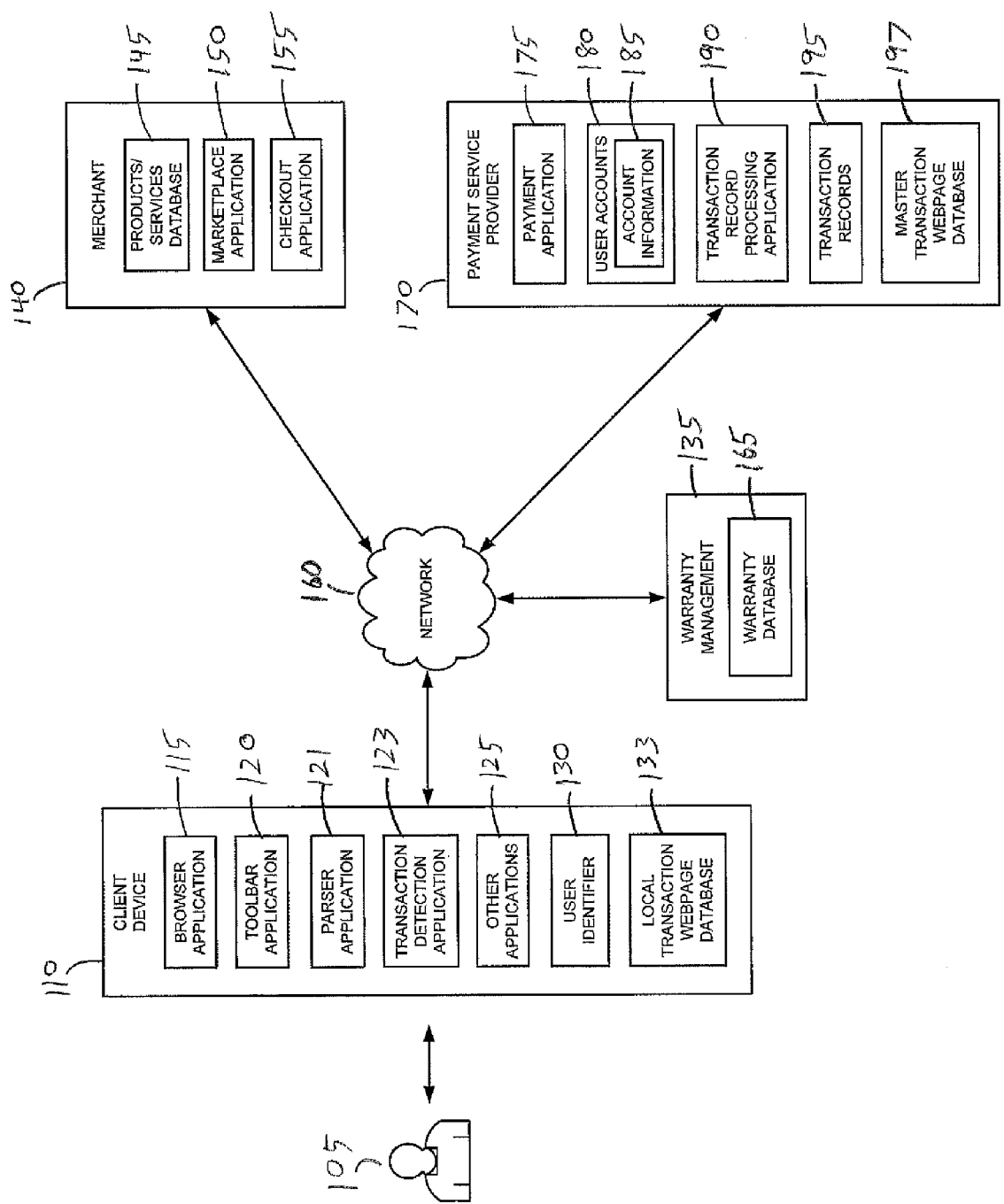
FIG. 1 illustrates a block diagram of a networked system configured to provide transaction record storage in accordance with an embodiment of the invention.

Referring now to the drawings wherein the showings are for purposes of illustrating embodiments of the present invention only, and not for purposes of limiting the same, FIG. 1 illustrates a block diagram of a networked system 100 configured to provide transaction record storage in accordance with an embodiment of the invention. As shown, system 100 includes a client device 110, a merchant server 140, a warranty management server 135, and a payment service provider server 170 in communication over a network 160.

Client device 110, warranty management server 135, merchant server 140, and payment service provider server 170 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal to the servers, external to the servers, and/or accessible by the servers over network 160.

Network 160 may be implemented as a single network or a combination of multiple networks. For example, in various embodiments, network 160 may include the Internet or one or more intranets, landline networks, wireless networks, and/or other appropriate types of networks.

Client device 110 may be implemented using any appropriate combination of hardware and/or software configured for wired and/or wireless communication over network 160. For example, in one embodiment, client device 110 may be implemented as a personal computer of a user 105 (e.g., a customer) in communication with the Internet. In other embodiments, client 110 may be implemented as a wireless telephone, personal digital assistant (PDA), notebook computer, and/or other types of computing devices.

As shown, client device 110 may include one or more browser applications 115 which may be used, for example, to provide a convenient interface to permit user 105 to browse information available over network 160. For example, in one embodiment, browser application 115 may be implemented as a web browser configured to view webpages or other content available over the Internet.

Client device 110 may also include one or more toolbar applications 120 which may be used, for example, to provide client-side processing for performing desired tasks in response to operations selected by user 105. In one embodiment, toolbar application 120 may display a user interface in connection with browser application 115. In this regard, toolbar application 120 may be configured to receive input commands from user 105 instructing client device 110 to capture transaction information displayed by browser application 115, flag webpages containing transaction information, or perform other tasks.

Client device 110 may also include a parser application 121 and a transaction detection application 123 that may be used to process webpages displayed by browser application 115. Parser application 121 may be implemented to parse the webpages to identify various data included in the webpages. Transaction detection application 123 may process the data identified by parser application 121 (for example, by applying predetermined heuristics) to ascertain various characteristics of the webpages that may be associated with transaction information. For example, in one embodiment, such heuristics may include the presence of dollar amounts, shipping information, or other information that may be associated with transactions performed by user 105 over network 160. Accordingly, by parsing webpages with parser application 121 and further processing the parsed data with transaction detection application 123, client device 110 may identify whether a given webpage includes transaction information associated, for example, with one or more transactions performed by user 105 over network 160.

Client device 110 may further include other applications 125 as may be desired in particular embodiments to provide desired features to client device 110. For example, in various embodiments, such other applications 125 may include security applications for implementing client-side security features, programmatic client applications for interfacing with appropriate application programming interfaces (APIs) over network 160, or other types of applications.

As also shown in FIG. 1, client device 110 includes one or more user identifiers 130 which may be implemented, for example, as operating system registry entries, cookies associated with browser application 115, identifiers associated with hardware of client device 110, or other appropriate identifiers. In one embodiment, user identifier 130 may be used by a payment service provider to associate user 105 with a particular account maintained by the payment service provider as further described herein.

Client device 110 may optionally include a local transaction webpage database 133 that identifies various webpages previously determined to be associated with transaction information. For example, in one embodiment, local transaction webpage database 133 may include a list of addresses (for example, uniform resource identifiers (URLs)) or domains that may be associated with webpages of merchant server 140 or payment service provider server 170. In this regard, transaction detection application 123 may be implemented to compare an address associated with a given webpage received by browser application 115 to entries in local transaction webpage database 133 to identify webpages that include transaction information.

Merchant server 140 may be maintained, for example, by an online merchant offering various products and/or services in exchange for payment to be received over network 160. In this regard, merchant server 140 includes a products/services database 145 identifying available products and/or services which may be made available for viewing and purchase by user 105. Accordingly, merchant server 140 also includes a marketplace application 150 which may be configured to serve information over network 160 to browser 115 of client 110. For example, in one embodiment, user 105 may interact with marketplace application 150 through browser application 115 over network 160 in order to search and view various items identified in products/services database 145.

Merchant server 140 also includes a checkout application 155 which may be configured to facilitate the purchase by user 105 of items identified by marketplace application 150. In this regard, checkout application 155 may be configured to accept payment information from user 105 and/or from payment service provider server 170 over network 160.

Warranty management server 135 includes a warranty database 165 which may be configured to store warranty information associated with various items identified by products/services database 145 of merchant server 140. For example, in one embodiment, warranty database 165 may identify particular time periods associated with various warranties of particular items. Warranty management server 135 may be implemented to serve relevant warranty information in response to warranty information requests by payment server provider server 170 as further described herein. In various embodiments, warranty management server 135 may be operated, for example, by a merchant, a payment service provider, a warranty provider, or other appropriate entities.

Payment service provider server 170 may be maintained, for example, by an online payment service provider which may provide payment on behalf of user 105 to the operator of merchant server 140. In this regard, payment service provider server 170 includes one or more payment applications 175 which may be configured to interact with client device 110 and/or merchant server 140 over network 160 to facilitate the purchase of items by user 105 from merchant server 140. In one embodiment, payment service provider server 170 may be provided by PayPal, Inc.

Payment service provider server 170 also maintains a plurality of user accounts 180, each of which may include account information 185 associated with individual users. For example, in one embodiment, account information 185 may include private financial information of user 105 such as account numbers, passwords, credit card information, bank information, or other financial information which may be used to facilitate online transactions by user 105. Advantageously, payment application 175 may be configured to interact with merchant server 140 on behalf of user 105 during a transaction with checkout application 155 without requiring user 105 to provide account information 185 to merchant server 170.

Payment service provider server 170 further maintains a plurality of transaction records 195 which are associated with individual user accounts 180. As further described herein, transaction records 195 may be implemented to store transaction information associated with particular online transactions between user 105 and merchant server 140 (i.e., user-merchant transactions). Accordingly, payment service provider server 170 can provide centralized storage of transaction information.

Payment service provider server 170 also provides a transaction record processing application 190 which may be configured to serve particular transaction records 195 to client device 110 in response to user requests. Transaction record processing application 190 may further be configured to serve warranty information received from warranty management server 135 in response to user requests.

Payment service provider server 170 may optionally include a master transaction webpage database 197 that identifies various webpages as being associated with transaction information as similarly described above with regard to local transaction webpage database 133. In this regard, transaction detection application 123 of client device 110 may be implemented to send requests to payment service provider 170 to compare an address associated with a given webpage to entries in master transaction webpage database 197 to identify webpages that include transaction information.

Figure 2A:
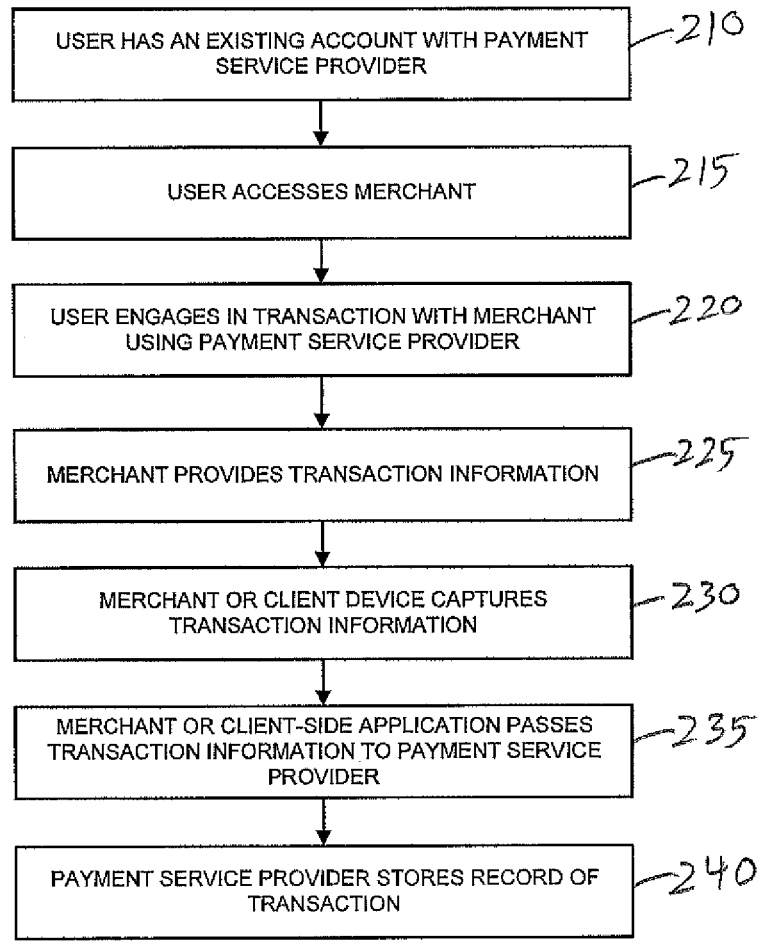
FIG. 2A illustrates a transaction process in accordance with an embodiment of the invention.

FIG. 2A illustrates a transaction process in accordance with an embodiment of the invention. In initial step 210, it is assumed that user 105 has previously registered with payment service provider server 170 to open a user account 180. In this regard, it will be appreciated that user 105 may have previously provided account information 185 to payment service provider server 170 over network 160 through, for example, a secure connection between client device 110 and payment service provider server 170.

As a result of such previous registration, client device 110 stores a user identifier 130 that may be used to identify the particular user 105 as having a user account 180 maintained by payment service provider server 170. As previously described, user identifier 130 may be implemented, for example, as one or more cookies, operating system registry entries, hardware identifiers, or other types of identifiers.

In step 215, user 105 accesses an online marketplace provided by merchant server 140. For example, in one embodiment, user 105 may use browser application 115 to access a webpage provided by marketplace application 150 of merchant server 140. In this regard, marketplace application 150 may be configured to display various items identified in products/services database 145. Also in step 215, user 105 may optionally select such items for purchase through interaction between browser application 115 and checkout application 155.

Then, in step 220, user 105 engages in a transaction with merchant server 140 to purchase various items selected during previous step 215. In this regard, user 105 may authorize an operator of payment service provider server 170 to provide relevant financial information (e.g., account information 185 from one of user accounts 180 associated with user 105) for executing such transactions on behalf of user 105. In one embodiment, client device 110 may interact with merchant server 140 during step 220. In another embodiment, payment service provider server 170 may interact with merchant server 140 on behalf of client device 110 and user 105 during step 220.

In step 225, merchant server 140 provides information associated with the transaction performed in previous step 220. For example, in one embodiment, merchant server 140 may provide a webpage including transaction details to client device 110 which may be viewed by user 105 through browser application 115. In another embodiment, merchant server 140 may provide an email message to client device 110 identifying such transaction details. In one embodiment, the transaction information provided by merchant server 140 in step 225 may include program code, such as JavaScript™ code embedded in a webpage, that is executable by client device 110.

Figure 3:
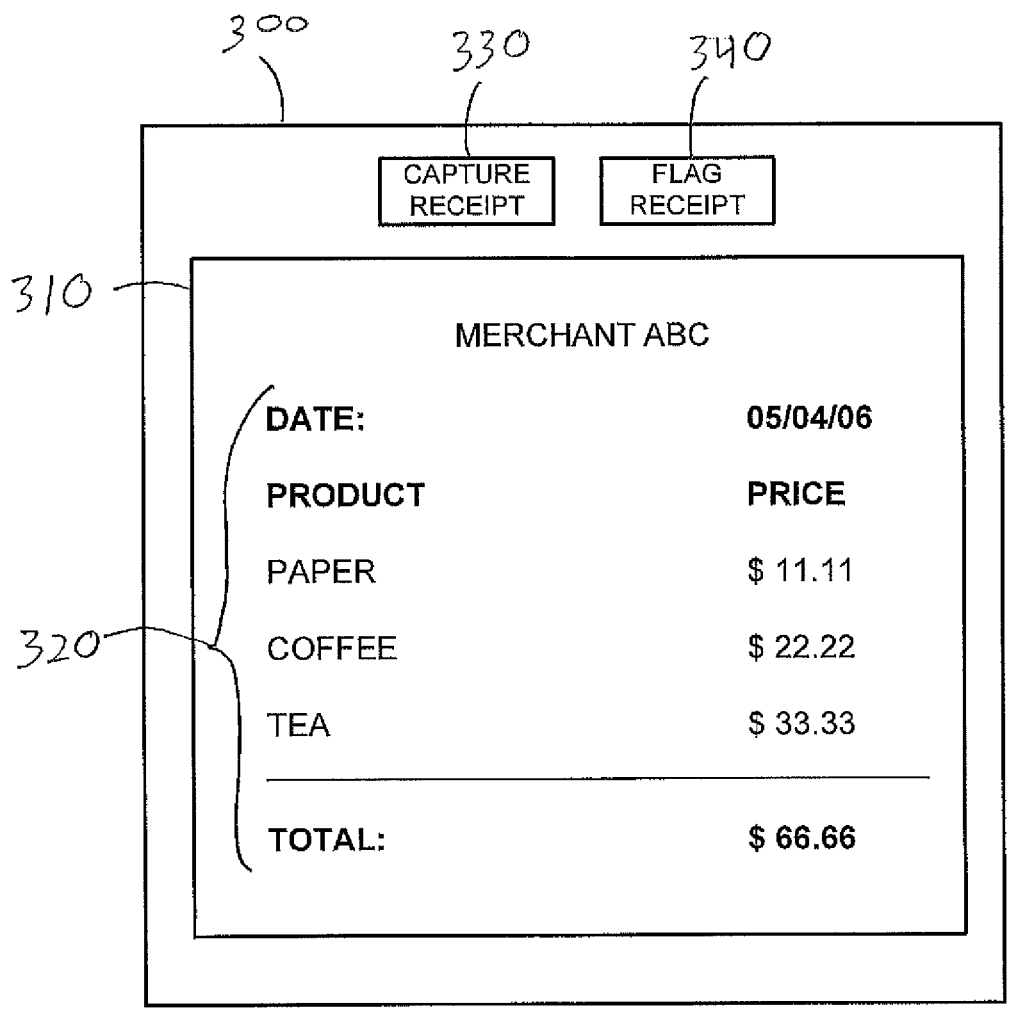
FIG. 3 illustrates a sample user interface displayed to a user during the process of FIG. 2A in accordance with an embodiment of the invention.

FIG. 3 illustrates a sample user interface 300 that may be displayed to user 105 on client device 110 by browser application 115 for viewing transaction information provided in step 225. In this regard, user interface 300 includes a browser window 310 provided by browser application 115 to display a dynamically created webpage. As shown, browser window 310 includes various product descriptions 320 provided by marketplace application 150 which correspond to various products purchased by user 105 during previous step 220.

Returning to FIG. 2A, in step 230, merchant server 140 or client device 110 captures the transaction information provided in step 225. For example, in one embodiment, merchant server 140 may capture the transaction information locally in HTML, XML, or another text-based format. In another embodiment, merchant server 140 may capture a graphic image of the transaction record. Similarly, in other embodiments, toolbar application 120 or other applications 125 of client device 110 may capture the transaction information locally in HTML, XML, or another text-based format, or may capture a graphic image of the transaction information. In one embodiment, the capturing may be performed by client device 110 in response to one or more commands initiated by user 105. Such commands may include, for example, user 105 selecting an appropriate button 330 displayed in user interface 300 by toolbar application 120. In another embodiment, such capturing may be performed by client device 110 without requiring interaction by user 105. In one embodiment, client device 110 may perform the process of FIG. 2B during step 230 as further described herein.

In various embodiments, the transaction information captured in step 230 may include, for example, line item details for particular items purchased in the transaction of step 220, links to one or more webpages maintained by merchant server 140 that are associated with particular purchased items, personal or financial information of user 105, user identifier 130, identification information of a particular merchant, merchant policy terms (e.g., individual merchant return policies), shipping information, terms and conditions previously described herein, or other information.

Following step 230, merchant server 140 or client device 110 passes the captured transaction information to payment service provider server 170 (step 235). For example, if transaction information is captured and passed by merchant server 140, such information may be passed from merchant server 140 to payment service provider server 170 over network 160 in response to the capturing performed in step 230 by merchant server 140.

In another example, if transaction information is captured and passed by client device 110, such information may be passed from client device 110 to payment service provider server 170 over network 160 in response to the capturing performed in step 230 by client device 110. As discussed, the transaction information provided by merchant server 140 in previous step 225 may include program code that is executable by client device 110. Such code may be executed by client device 110 in step 235 to cause client device 110 to pass transaction information to payment service provider server 170.

In another example, if transaction information is captured and passed by client device 110, such information may be passed from client device 110 to payment service provider server 170 over network 160 using a printer driver (e.g., maintained by client device 110 as one of other applications 125). In this regard, such a printer driver may be configured to send transaction information (e.g., transaction information captured in step 230 of FIG. 2A) to payment service provider server 170 over network 160 in response to user 105 selecting button 330 of user interface 300 shown in FIG. 3.

In step 240, payment service provider server 170 stores the captured transaction information as one of transaction records 195 associated with the particular user account 180 of user 105.

It will be appreciated that by performing the process of FIG. 2A for a plurality of transactions by user 105 with merchant server 140 and/or other merchants, a plurality of transaction records 195 may be stored by payment service provider server 170 and associated with an appropriate user account 180 associated with user 105. Such transaction records 195 may be subsequently accessed by user 105 to facilitate additional operations as further described herein.

Figure 2B:
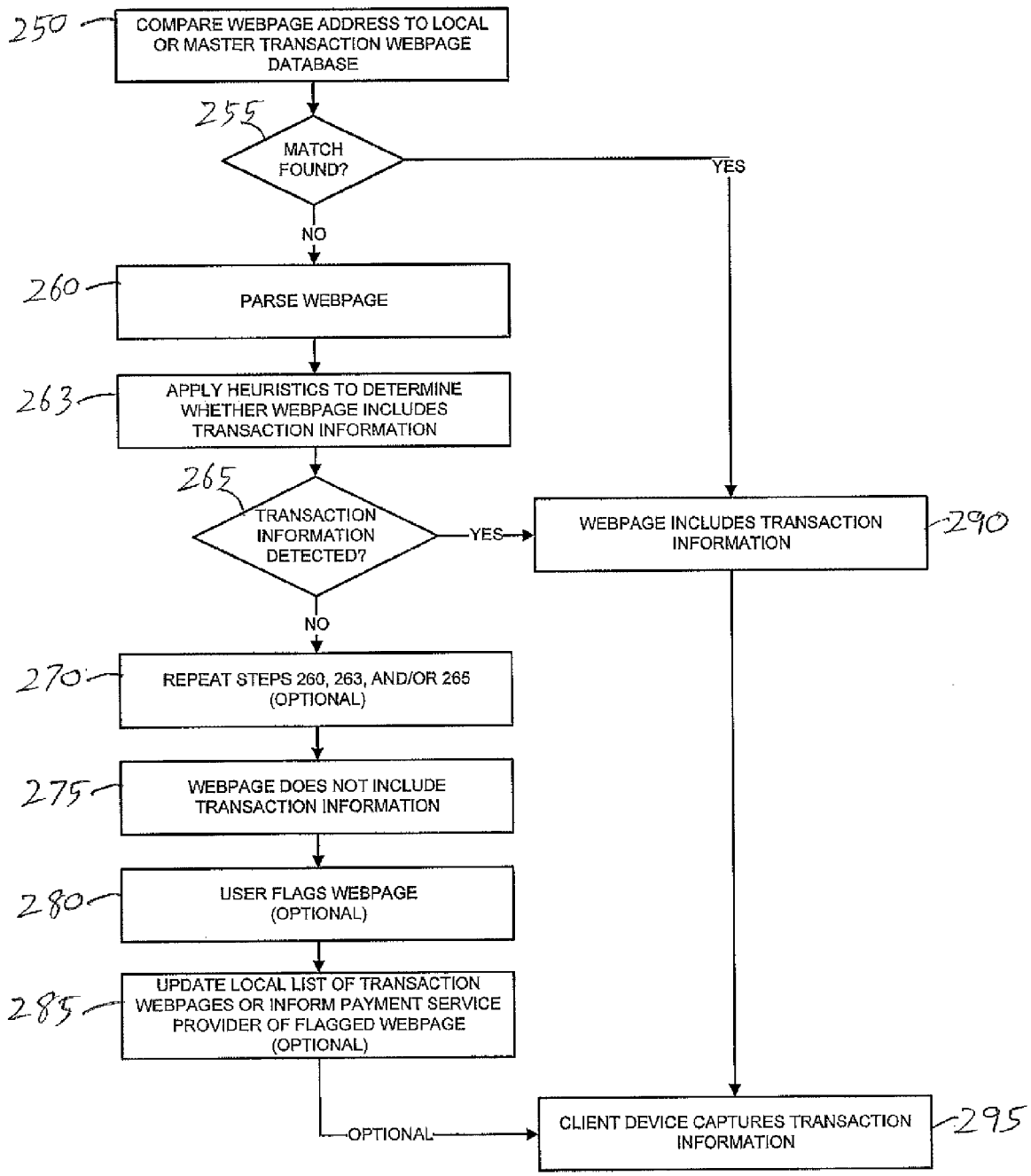
FIG. 2B illustrates a process of determining whether a webpage includes transaction information in accordance with an embodiment of the invention.

FIG. 2B illustrates a process of determining whether a webpage includes transaction information in accordance with an embodiment of the invention. As previously discussed, the process of FIG. 2B may be performed by client device 110 during step 230 of FIG. 2A.

In step 250, transaction detection application 123 compares an address (e.g., a URI or other appropriate identifier) of a webpage (e.g., a webpage provided to client device 110 during earlier step 225) to local transaction webpage database 133 or master transaction webpage database 197. If a matching address is found (step 255), then transaction detection application 123 will determine that the webpage includes transaction information (step 290). Following step 290, client device 110 captures the transaction information by, for example, capturing a record of the webpage in any appropriate manner as previously discussed.

If a match is not found in step 255, then the process of FIG. 2B continues to step 260. In step 260, parser application 121 parses the webpage to identify data included in the webpage. In step 263, transaction detection application 123 applies heuristics to the data identified in previous step 260 in order to ascertain various characteristics of the webpages that may be associated with transaction information as previously discussed. If the processing performed in step 263 detects that the webpage likely includes transaction information (step 265), then the process of FIG. 2B continues to step 290 as previously discussed. If no transaction information is detected in step 265, then steps 260, 263, and/or 265 may be optionally repeated as many times as desired to further attempt to detect transaction information. In one embodiment, transaction detection application 123 may apply different heuristics during repeated iterations of step 263.

In step 275, transaction detection application 123 determines that the currently processed webpage likely does not include transaction information. In step 280, user 105 may optionally flag the webpage (for example, by selecting an appropriate button 340 displayed in user interface 300 by toolbar application 120 as shown in FIG. 3) to indicate that user 105 believes the webpage does indeed include transaction information. In response to step 280, transaction detection application 123 may optionally update local transaction webpage database 133 to include an address associated with the current webpage (step 285). Alternatively in step 285, transaction detection application 123 may inform payment service provider server 170 of the user's 105 flagging of the current webpage. In this case, payment service provider server 170 may optionally update master transaction webpage database 197 to include an address associated with the current webpage. Following step 285, the process of FIG. 2B may optionally continue to step 295 previously discussed above.

Figure 4:
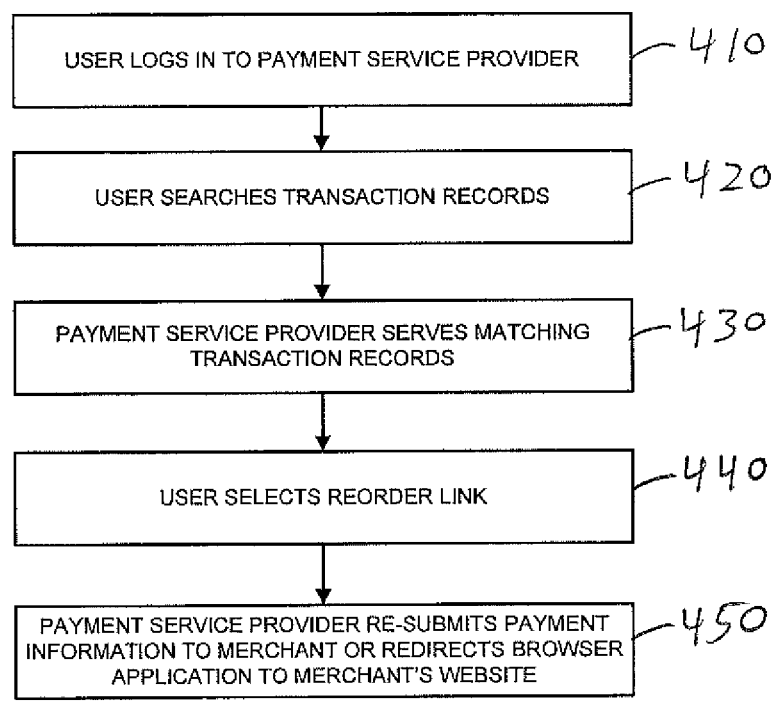
FIG. 4 illustrates a process of retrieving transaction records in accordance with an embodiment of the invention.

FIG. 4 illustrates a process of retrieving transaction records 195 in accordance with an embodiment of the invention. The process of FIG. 4 may be performed following the process of FIG. 2A.

In step 410, user 105 logs in to payment service provider server 170 in order to authenticate user 105 for accessing the particular transaction records 195 associated with one of user accounts 180. For example, in one embodiment, user 105 may interact with payment service provider server 170 through an appropriate browser interface provided by browser application 115.

In response to a successful log in, payment service provider server 170 may permit user 105 to enter one or more search terms for searching the contents of transaction records 195 (step 420). In response to a search request entered by user 105, payment service provider server 170 retrieves and serves any of transaction records 195 matching the search terms to client device 110 for display to user 105 by browser application 115 (step 430).

Figure 5:
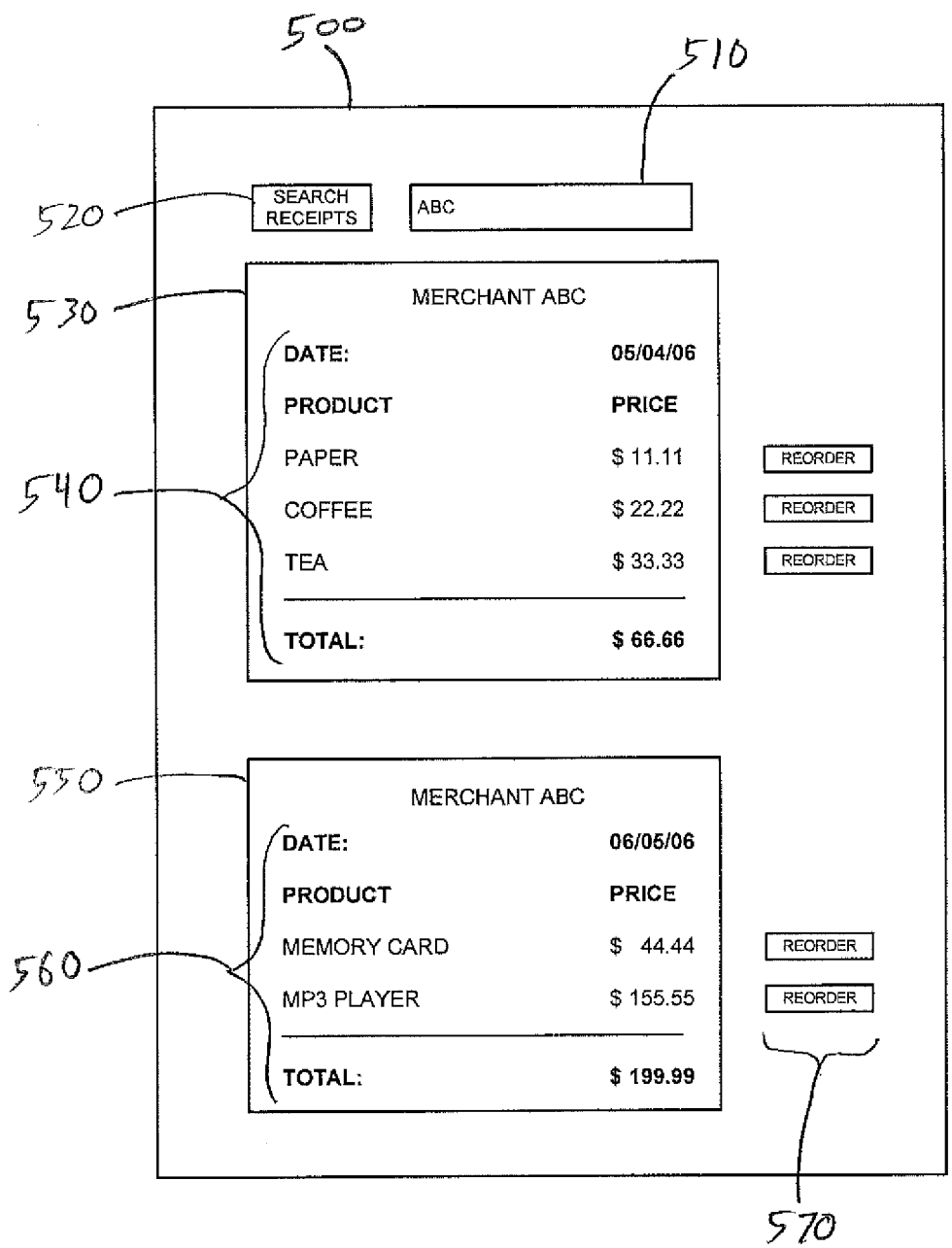
FIG. 5 illustrates a sample user interface displayed to a user during the process of FIG. 4 in accordance with an embodiment of the invention.

For example, FIG. 5 illustrates a sample user interface 500 that may be displayed to user 105 on client device 110 by browser application 115 for viewing transaction record search results provided in step 430. In this regard, user interface 500 includes a search window 510 into which user 105 may enter desired search terms. A user-operable button 520 is also provided which may cause transaction record processing application 190 to search transaction records 195 for the terms entered in search window 510.

In the embodiment illustrated in FIG. 5, transaction record processing application 190 has returned two particular transaction records 530 and 550 associated with the search term "ABC" entered in search window 510. In this regard, it will be appreciated that transaction records 530 and 550 each include various transaction information 540 and 560, respectively, associated with different transactions executed by user 105 in relation to a particular merchant ("Merchant ABC"). Accordingly, it will be appreciated that in this embodiment merchant server 140 may be maintained by Merchant ABC. However, it will also be appreciated that a plurality of merchant servers 140 associated with different merchants may also be provided as part of system 100.

Advantageously, user interface 500 also includes a plurality of user-selectable reorder buttons 570 to permit user 105 to selectively re-purchase particular items identified in transaction records 530 and 550. In this regard, it will be appreciated that the transaction information previously provided to payment service provider server 170 (e.g., in step 235 of FIG. 2A) may include, for example, line item details for particular items purchased in the transaction, links to one or more webpages maintained by merchant server 140 that are associated with particular purchased items, personal or financial information of user 105, user identifier 130, identification information of a particular merchant, or other information.

Accordingly, each of reorder buttons 570 may be associated with particular features provided by payment service provider server 170. In one embodiment, payment application 175 may be configured to execute another transaction with checkout application 155 of merchant server 140 to re-purchase a particular item listed in transaction records 530 or 550. In this regard, it will be appreciated that payment application 155 may use account information 185 and transaction records 195 to link to merchant server 140 and provide relevant information to merchant server 140 in order to perform such a transaction in response to a selection of one of reorder buttons 570 by user 105.

In another embodiment, payment service provider server 170 may be implemented to redirect browser application 115 of client device 110 to a webpage associated with a particular item listed in transaction records 530 or 550. In this regard, it will be appreciated that payment service provider server 170 may use transaction records 195 to provide a relevant link to a webpage associated with the item in response to a user's selection of one of reorder buttons 570. It will be appreciated that the above-identified features associated with reorder buttons 570 may be particularly useful to customers that frequently repurchase items, such as refills of consumable office supplies (e.g., paper or printer cartridges), food, medication, or other items to be replenished.

Returning to FIG. 4, in step 440, user 105 selects one of reorder buttons 570 of user interface 500. In one embodiment, the following step 450 may be performed by payment application 175 executing another transaction with checkout application 155 of merchant server 140 to re-purchase the particular item associated with the selected reorder button 570. It will be appreciated that in this embodiment, previously-described steps 225 through 240 of FIG. 2A may be performed to provide payment service provider 170 with transaction information (e.g., to be stored by payment service provider server 170 as an additional transaction record 195) associated with the new transaction performed in step 450.

In another embodiment, step 450 may be performed by payment service provider server 170 redirecting browser application 115 of client device 110 to a webpage associated with the particular item associated with the selected reorder button 570. In this embodiment, steps 225 through 240 of FIG. 2A may be performed to provide payment service provider 170 with transaction information associated with the new transaction performed in step 450.

Figure 6:
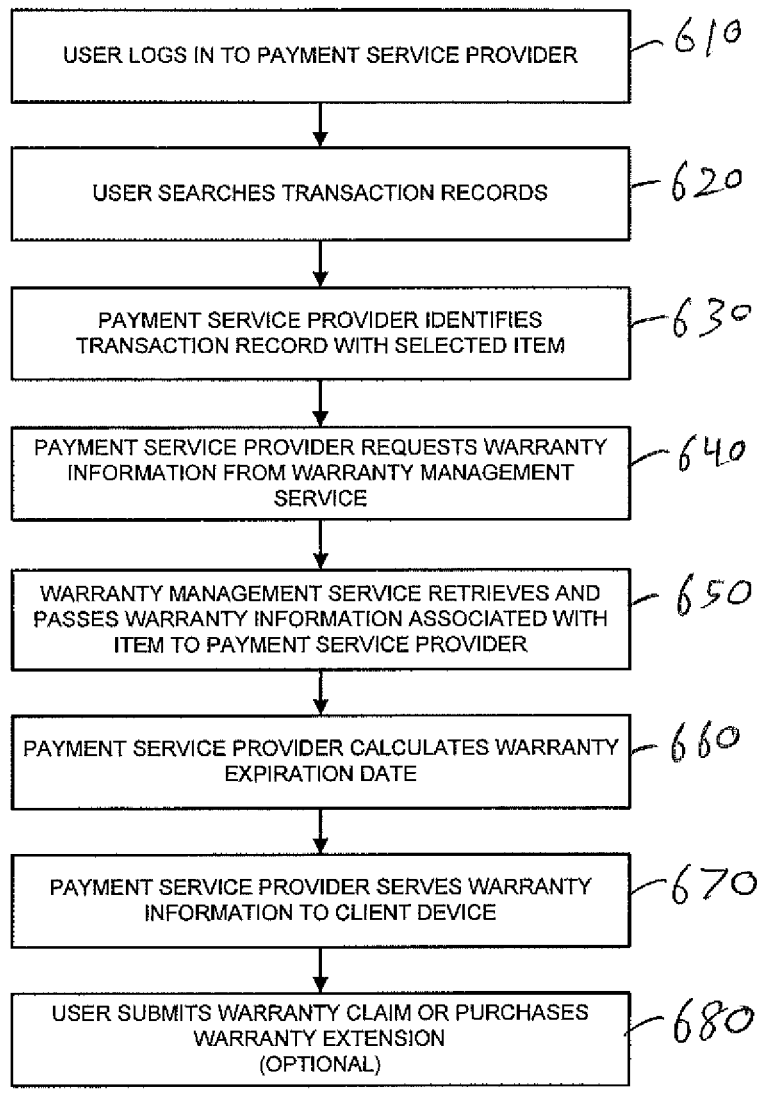
FIG. 6 illustrates a process of retrieving warranty information in accordance with an embodiment of the invention.

FIG. 6 illustrates a process of retrieving warranty information in accordance with an embodiment of the invention. In step 610, user 105 logs in to payment service provider server 170 as previously described with regard to step 410 of FIG. 4. Then, in step 620, user 105 may search the contents of transaction records 195 as previously described with regard to step 420 of FIG. 4. In response to a search request entered by user 105, payment service provider server 170 identifies any items in transaction records 195 matching the search terms (step 630).

Payment service provider server 170 then passes a request to warranty management server 135 requesting warranty information corresponding to the matching items (step 640). As previously described, warranty management server 135 includes a warranty database 165 which may be configured to store warranty information associated with various items identified by products/services database 145 of merchant server 140. Accordingly, in step 650, warranty management server 135 retrieves any available warranty information concerning the requested items from warranty database 165. Also in step 650, warranty management server 135 passes such warranty information to payment service provider 170. For example, in one embodiment, such warranty information may identify an association between the requested item and a standard warranty period (e.g., ninety days, one year, or other periods).

In step 660, payment service provider server 170 calculates the warranty expiration date associated with the requested item. Because the purchase date of the item may be stored by payment service provider server 170 as part of transaction records 195, payment service provider server 170 can proceed to calculate the warranty expiration date using the purchase date and the warranty information received from warranty management server 135.

Figure 7:
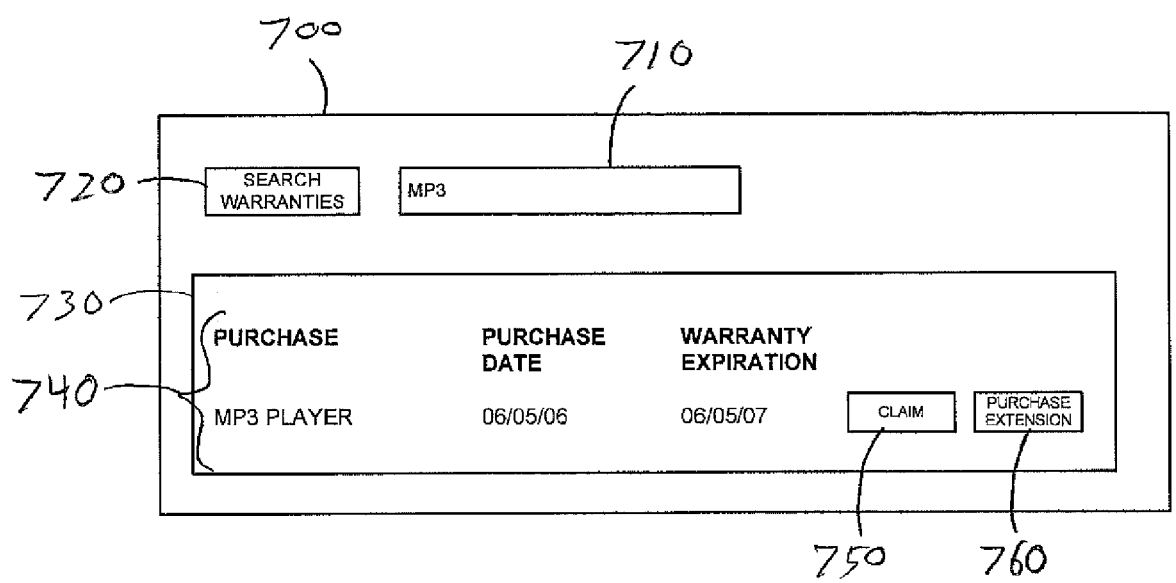
FIG. 7 illustrates a sample user interface displayed to a user during the process of FIG. 6 in accordance with an embodiment of the invention.

In step 670, payment service provider server 170 serves the warranty expiration date to client device 110 for display to user 105 by, for example, browser application 115. For example, FIG. 7 illustrates a sample user interface 700 that may be displayed to user 105 on client device 110 by browser application 115 for viewing warranty information during step 660. In this regard, user interface 700 includes a search window 710 into which user 105 may enter desired search terms. A user-operable button 720 is also provided which may cause transaction record processing application 190 to search transaction records 195 for the terms entered in search window 710, request and retrieve corresponding warranty information, and display such information in a window 730.

In the embodiment illustrated in FIG. 7, transaction record processing application 190 has returned warranty information 740 for one previously purchased item associated with the search term "MP3" entered in search window 710. In this regard, it will be appreciated that warranty information 740 identifies the item purchased and its purchase date, each of which may be obtained from one of transaction records 195 (e.g., transaction record 550 previously described with regard to FIGS. 4 and 5).

In this case, warranty management server 135 has retrieved warranty information corresponding to the displayed "MP3 PLAYER" item. Specifically, warranty management server 135 has found that the item is associated with a one year warranty period. Accordingly, as shown in FIG. 7, the warranty expiration date has been calculated as occurring one year from the purchase date.

As also shown in FIG. 7, user interface 700 may further include user-selectable buttons 750 and 760 which may be implemented to permit user 105 to submit a warranty claim or purchase a warranty extension, respectively. In this regard, it will be appreciated that payment service provider server 170 may be configured to interact with an appropriate warranty management provider through, for example, warranty management server 135, merchant server 140, or other servers over network 160 which may be configured to facilitate such features. Returning to FIG. 6, in optional step 680, user 105 may choose to submit a warranty claim or purchase a warranty extension as described above with regard to buttons 750 and 760.

Although FIGS. 6-7, warranty management server 135, and warranty database 165 have been described with respect to providing warranty information, such portions of the present disclosure may optionally be adapted to service other types of information associated with particular items purchased by user 105 in previous transactions with merchant server 140. For example, server 135 may be implemented to provide payment service provider server 170 with various terms and conditions associated with items identified in transaction records 195 as such information may be desired in particular implementations.

In view of the present disclosure, it will be appreciated that various methods and systems have been described for storing, retrieving, and utilizing transaction records associated with online transactions. Advantageously, transaction records for a plurality of different merchants may be aggregated by a payment service provider in a centralized manner, thereby allowing a user to search the records. Such transaction records may be associated with user-selectable links to permit users to reorder previously purchased items, obtain warranty information, and request warranty services for items referenced by the transaction records. The transaction records may also be used for tracking chargebacks associated with particular merchants and for dispute resolution.

Advantageously, payment service providers may leverage the above-described integrated warranty features to motivate additional purchases by users. For example, by providing users with selectable links for purchasing warranty extensions, payment service providers may offer their services to facilitate such transactions. In addition, payment service providers may offer automatic warranty extensions to users for items purchased using their services. The availability of such features may also be used by payment service providers to encourage additional merchants to accept payment from such payment service providers.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the invention, persons of ordinary skill in the art will recognize that changes may be made in form and detail without departing from the scope of the invention. Thus the invention is limited only by the claims.

What is claimed is:

1. A payment service processing system comprising:
 a plurality of searchable machine-readable transaction records associated with a plurality of user accounts, the searchable machine-readable transaction records comprising transaction information associated with a plurality of user-merchant transactions, wherein the transaction information is provided by one or more merchant servers and is captured and passed by one or more users to the payment service processing system in response to a determination performed at a respective client device of the user(s) that a webpage comprises transaction information such that an address of the webpage matches an address in a transaction webpage database;
 one or more processors; and
 one or more memories adapted to store a plurality of machine-readable instructions which when executed by the one or more processors are adapted to cause the system to provide:
 a transaction record processing application configured to store the captured transaction information in the searchable machine-readable transaction records associated with the user accounts on the payment service processing system.

2. The system of claim 1, wherein the plurality of machine-readable instructions are adapted to further cause the system to allow the user(s) to search the contents of the searchable machine-readable transaction records by entering one or more search terms.

3. The system of claim 1, wherein the transaction information provided by the merchant server(s) further comprises program code embedded in the webpage, the program code being executable by the respective client device.

4. The system of claim 1, wherein the transaction information is provided by the merchant server(s) in an email message to the respective client device.

5. The system of claim 1, wherein the transaction information is captured by the client device locally in a text-based format, or in a graphic image of the transaction information.

6. The system of claim 1, wherein the transaction information is captured and passed by a printer driver of the client device.

7. A machine-implemented method of managing transaction information, wherein the method is perfoimed by a payment service processing system associated with a payment service provider, the method comprising:
- receiving, at the payment service processing system, transaction information associated with a user-merchant transaction, wherein the transaction information is provided by a merchant server and is captured and passed by a user to the payment service processing system in response to a determination performed at the client device that a webpage comprises transaction information such that an address of the webpage matches an address in a transaction webpage database; and
- storing the captured transaction information in a searchable machine-readable transaction record associated with a user account on the payment service processing system.

8. The method of claim 7, further comprising allowing the user to search contents of the searchable machine-readable transaction record by entering one or more search terms.

9. The method of claim 7, wherein the transaction information provided by the merchant server further comprises program code embedded in the webpage, the program code being executable by the client device.

10. The method of claim 7, wherein the transaction information is provided by the merchant server in an email message to the client device.

11. The method of claim 7, wherein the transaction information is captured by the client device locally in a text-based format, or in a graphic image of the transaction information associated with the user-merchant transaction.

12. The method of claim 7, wherein the transaction information is captured by the client device locally in HTML or XML format.

13. The method of claim 7, wherein the transaction information is captured and passed by a printer driver of the client device.

14. A machine-implemented method of processing transaction information, wherein the method is performed by a client device of a user, the method comprising:
- receiving, at the client device, transaction information associated with a user-merchant transaction, wherein the transaction information is provided by a merchant server;
- determining, at the client device, whether a webpage comprises the transaction information such that if an address of the webpage matches an address of a transaction webpage database, then the webpage comprises the transaction information;
- in response to determining that the webpage comprises at least a portion of the transaction information, capturing, at the client device, at least a portion of the transaction information associated with the user-merchant transaction, and
- passing, by the client device, the transaction information over a network in order to facilitate storage of the transaction information in a transaction record.

15. The method of claim 14, further comprising:
- determining, by the client device, that the webpage address does not match an address of the transaction webpage database;
- parsing the webpage to identify data included in the webpage;
- applying heuristics to the identified data to ascertain whether the webpage comprises the transaction information; and
- performing the capturing and passing upon ascertaining that the webpage comprises the transaction information.

16. The method of claim 14, further comprising allowing the user to search contents of the searchable machine-readable transaction record by entering one or more search terms.

17. The method of claim 14, wherein the transaction information provided by the merchant server further comprises program code embedded in the webpage, the program code being executable by the client device.

18. The method of claim 14, wherein the transaction information is provided by the merchant server in an email message to the client device.

19. The method of claim 14, wherein the transaction infoimation is captured by the client device locally in a text-based format, or in a graphic image of the transaction information associated with the user-merchant transaction.

20. The method of claim 14, wherein the transaction information is captured and passed by a printer driver of the client device.

* * * * *